(12) United States Patent
Pille-Wolf et al.

(10) Patent No.: US 8,637,606 B2
(45) Date of Patent: Jan. 28, 2014

(54) TIRES AND TREAD FORMED FROM PHENOL-AROMATIC-TERPENE RESIN

(75) Inventors: Wolfgang Pille-Wolf, Tervuren (BE); Abhay Deshpande, Savannah, GA (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 39 days.

(21) Appl. No.: 12/814,433

(22) Filed: Jun. 11, 2010

(65) Prior Publication Data

US 2010/0317800 A1 Dec. 16, 2010

Related U.S. Application Data

(60) Provisional application No. 61/186,371, filed on Jun. 11, 2009.

(51) Int. Cl.
*C08G 81/02* (2006.01)
*C08F 12/08* (2006.01)
*C08F 12/34* (2006.01)

(52) U.S. Cl.
USPC ............ 525/133; 526/308; 526/313; 526/346

(58) Field of Classification Search
USPC ............................ 525/133; 526/308, 313, 346
See application file for complete search history.

(56) References Cited

U.S. PATENT DOCUMENTS

| | | | |
|---|---|---|---|
| 3,514,417 A * | 5/1970 | Bickel et al. ............... | 156/307.1 |
| 4,550,142 A | 10/1985 | Akita et al. | |
| 4,701,517 A | 10/1987 | Daughenbaugh, Jr. | |
| 5,001,196 A | 3/1991 | Kawanaka et al. | |
| 5,726,237 A | 3/1998 | Satoh et al. | |
| 5,852,089 A | 12/1998 | Kawazura et al. | |
| 5,877,249 A | 3/1999 | Lambotte | |
| 5,916,957 A | 6/1999 | Itoh et al. | |
| 6,204,320 B1 | 3/2001 | Blok et al. | |
| 6,228,944 B1 * | 5/2001 | Blok et al. ..................... | 525/210 |
| 6,357,499 B1 * | 3/2002 | Kralevich et al. .......... | 152/209.1 |
| 7,084,228 B2 | 8/2006 | Labauze et al. | |
| 8,088,481 B2 * | 1/2012 | Tabata ........................ | 428/343 |
| 2005/0148713 A1 * | 7/2005 | Labauze et al. ............... | 524/311 |
| 2005/0234182 A1 | 10/2005 | Kunisawa | |
| 2005/0282950 A1 | 12/2005 | Labauze | |
| 2006/0217511 A1 * | 9/2006 | Locko et al. .................. | 527/503 |
| 2007/0037908 A1 | 2/2007 | Pille-Wolf | |
| 2008/0000389 A1 * | 1/2008 | Locko et al. ............. | 106/287.28 |

FOREIGN PATENT DOCUMENTS

| | | |
|---|---|---|
| EP | 0117834 A1 | 9/1984 |
| EP | 0299074 A1 | 1/1989 |
| EP | 0351054 A1 | 1/1990 |
| EP | 0447066 A1 | 9/1991 |
| EP | 0754571 A1 | 1/1997 |
| EP | 0990669 A1 | 4/2000 |
| EP | 1028130 A1 | 8/2000 |
| EP | 1029873 A1 | 8/2000 |
| EP | 1029874 A1 | 8/2000 |
| EP | 1035164 A1 | 9/2000 |
| EP | 1050547 A1 | 11/2000 |
| EP | 1063246 A1 | 12/2000 |
| EP | 1077223 A1 | 2/2001 |
| JP | 01-215838 | 8/1989 |
| WO | 02/083432 A1 | 10/2002 |

\* cited by examiner

*Primary Examiner* — Mike M Dollinger

(57) ABSTRACT

Tires and tread are made from resin formed from the polymerization of phenol, aromatic, and terpene and/or mono- and bi-cyclic mono- and bi-unsaturated hydrocarbons.

15 Claims, No Drawings

TIRES AND TREAD FORMED FROM PHENOL-AROMATIC-TERPENE RESIN

RELATED APPLICATION DATA

This application claims priority of U.S. Provisional Patent Application No. 61/186,371, filed Jun. 11, 2009, which application is herein incorporated by reference.

BACKGROUND OF THE INVENTION

1. Field of the Invention

The present invention relates tires, treads, rubber compounds, additives for tires and/or treads compounds, and methods of making and using such tires and treads. In another aspect, the present invention to tread and tire additives comprising unsaturated aliphatic, cycloaliphatic and bicyloaliphatic hydrocarbons and/or olefinically unsaturated non-acidic terpene compounds, vinyl aromatic hydrocarbons and phenolic compounds, tire treads comprising such additives, tires comprising such additives, methods of making such tires, treads and tread compounds from such additives. In even another aspect, the present invention relates to tread and tire compound additives comprising unsaturated aliphatic, cyclo-aliphatic and bicylo-aliphatic hydrocarbons, and/or olefinically unsaturated non-acidic terpene compounds, vinyl aromatic hydrocarbons and phenolic compounds, tire treads and tire tread compounds comprising such additives, tires comprising such additives, methods of making such tires, treads and tread compounds from such additives, wherein such tires and treads exhibit an improved balance between wet traction, rolling resistance, abrasion resistance and steering stability.

2. Brief Description of the Related Art

A particular use, among many, of rubber compositions is for the creation of tires, such as those used in transportation, preferably automobiles. Among the many desirable attributes for tire tread compositions, a great resistance to abrasion is preferred. That is, rubber compositions that easily break down under frictional forces is not desirable because such compositions when used in a tire easily wear resulting in a short life. In addition, it is preferable that tires have very good web and/or dry grip. While dry grip is usually maintained by many rubber compositions, wet grip is not. Rubber compositions having good wet grip, thus improved wet skid resistance, is highly desirable for use in tires. Finally, it is highly desired to create a tire that helps increase the fuel economy in the transportation industry, for example in the automobile industry. One manner in which to increase fuel efficiency into a tire is to create the tire from a rubber composition that "likes" to roll. A rubber composition that "likes" to roll, in other words, has a reduced tendency to resist rolling. If a rubber composition has a reduced tendency to resist rolling, less energy is required to roll the tire. For example, less energy would be required out of the engine of an automobile if the automobile included tires made from, at least in part, rubber compositions that had a reduced tendency to resist rolling. While rubber compositions capable of being useful in tires and/or tire tread compositions are known, no such rubber composition having maximized abrasion resistance (e.g. mileage), maximized wet grip (e.g. wet skid resistance), and minimized resistance to rolling (e.g. maximizing fuel economy) is known to date.

During the 1990's, the interest of tire manufacturers in the use of resins in tire treads has increased. This interest was driven for various reasons. One is the invention of tire that is based on precipitated Silica filler technology and the use of solution styrene-butadiene rubber (SBR). The other is the introduction of Antibreaking systems (ABS) as a standard equipment of modern automobiles. In combination with ABS, the Silica fillers interacting with S-SBR with tailored micro and macro polymeric structure improve the wet traction, while they also influence the rolling resistance. Rubber formulations used in various tire components previously have been designed using conventional processing oils to soften and extend the rubber to reduce the viscosity of rubber compounds. Typically, aromatic processing oils, having a certain content of polycyclic aromatic (PCA) compounds or polyaromatic hydrocarbons (PAH), have been used. At the end of the 1990's it became apparent that the EU commission would ban such aromatic oil extenders used in tires due to their content of polycyclic aromatic hydrocarbons (PAH or PCA) by the year 2010. Distilled Aromatic Extract (DAE) is a major contributor to the dynamic properties, i.e. mainly traction due to the aromatic content. Replacement oils called non-labeled oil extenders have a lower aromatic content thus impacting negatively these desired dynamic properties. Treated Distilled Aromatic Extract (TDAE) is the alternative of choice because its impact on dynamic is less pronounced. When using Mild Extract Solvate (MES) with even less aromatic content than TDAE, there is even more so a need to compensate the drop in performance.

U.S. Pat. No. 4,701,517, issued Oct. 20, 1987 to Daughenbaugh, discloses a vinyl aromatic/terpene/phenol terpolymer having a Ring and Ball softening point of 69.degree. C. to 130.degree. C. prepared from a vinyl-substituted aromatic hydrocarbon, a monoterpene hydrocarbon and a phenol. The terpolymers are useful as tackifiers in adhesive compositions.

U.S. Pat. No. 5,723,566, issued Mar. 6, 1998, to Salvetat et al., discloses resinous copolymers comprising monomers units of each the groups of phenol compounds (I) and olefinically unsaturated non-acidic terpene compounds (II), characterized in that the copolymer contains monomer units from the group of polyunsaturated olefin compounds (III), the monomer units of compound (III) being 1% to 70% by weight of the total of the monomer units of compound (II) and (III), the monomer units of compound (II) and (III) being at least 50% by weight of the total of the monomer units of compound (I), (II) and (III). The melting point of the copolymer is at least 130° C. The copolymers can be used in inks.

U.S. Pat. No. 5,726,237 issued Mar. 10, 1998, to Satoh et al., discloses rubber compositions and pneumatic tires using the same in which the rubber compositions are used. In the rubber compositions, per 100 parts by weight of natural rubber and a conjugated diene-base synthetic rubber such as a butadiene-styrene copolymer rubber, is compounded 30 to 120 parts by weight of a carbon black having both a characteristic (concentration of >C.dbd.O functional groups)/N.sub.2 SA.gtoreq.4.0.times.10.sup.−4 and a characteristic (concentration of >C.dbd.O functional groups).gtoreq.(concentration of —OH functional groups).sup.2−0.1.times.(concentration of —OH functional groups)+0.03, or is compounded 30 to 120 parts by weight of a carbon black having the characteristic (concentration of >C.dbd.O functional groups)/N.sub.2 SA.gtoreq.4.0.times.10.sup.−4 and 0.05 to 5.0 parts by weight of at least one of a silane coupling agent, a hydrazide compound and a thiadiazole compound. The rubber compositions of the present invention and pneumatic tires using the rubber compositions excel in low rolling resistance and wet skid resistance.

U.S. Pat. No. 5,877,249, issued Mar. 2, 1999, to Lambotte, is directed to a tire with tread having silica reinforcement field. Specifically, the tread is reinforced with carbon black and precipitated silica where the tread rubbers are of a blend comprised of at least one diene-based elastomer and a styrene/α-methylstyrene resin.

U.S. Pat. No. 5,916,957, issued Jun. 29, 1999, to Itoh et al., discloses rubber compositions for tire tread that have a considerably improved rolling resistance without degrading wet-skid resistance, fracture resistance and wear resistance and comprises a particular styrene-isoprene copolymer as a rubber ingredient, in which a part or whole of the copolymer is a terminal-modified copolymer coupled at its active terminal with a particular halogenated tin compound.

U.S. Patent Application No. 20050234182, issued Oct. 20, 2005, to Kunisawa, discloses rubber compositions for tire tread, in which wet grip properties, rolling resistance, steering stability, abrasion resistance and processability are highly improved in a balanced manner. Specifically, the invention provides a rubber composition for a tread comprising (B) 30 to 120 parts by weight of carbon black and (C) 2 to 20 parts by weight of polyethylene glycol, based on (A) 100 parts by weight of a diene rubber containing 10 to 100% by weight of styrene-butadiene rubber having a hydroxyl group in the molecular chain; wherein the carbon black (B) has nitrogen-adsorbing specific surface area of 175 to 300 m.sup.2/g, cetyl trimethyl ammonium bromide oil absorption of 155 to 250 ml/100 g and iodine adsorption of 150 to 330 mg/g, and the ratio of cetyl trimethyl ammonium bromide oil absorption to iodine adsorption is 0.85 to 1.20.

U.S. Pat. No. 7,084,228, issued Aug. 1, 2006 to Labauze et al., discloses a rubber composition for a tire tread. Specifically, disclosed is a cross-linkable or cross-linked rubber composition usable to constitute a tire tread having improved wear resistance, a tread, and a tire incorporating this tread. The composition is particularly applicable to tires of passenger-vehicle type. The rubber composition includes a plasticizing resin of number-average molecular weight of from 400 to 2000 g/mol, the resin having units resulting from the polymerization of a monocyclic or bicyclic unsaturated terpene, in a mass fraction of from 70% to 100%, and having a glass transition temperature greater than 50.degree. C. and less than 120.degree. C.

Generally it is accepted by the technical community within the tire industry that tan δ measurements of a cured compound are good indicators for the expected performance of a High Performance (HP) tire. In a temperature sweep DMA the tan δ values at 0° C. are indicative for wet grip while at 60° C. they are for rolling resistance. The damping factor tan δ should be as high at 0° C., and at 60° C. as low as possible. Further, it is generally accepted by the technical community skilled in the art of compound and tire design that the dynamic storage modulus E' at 60° C. is a good indicator for steering stability, handling and cornering of the tire while driving.

U.S. Patent Application Publication No. 20070037908, published Feb. 15, 2007, discloses rubber compositions containing improved tackifiers, and that Terpene Phenol resins with low OH value show a favorable balance between the tan δ values at 0° C. and 60° C.

All of the patents cited in this specification, are herein incorporated by reference.

However, in spite of the above advancements, there still exists a need in the art for improved tires, treads, methods of making and using, and additives for making and using.

This and other needs in the art will become apparent to those of skill in the art upon review of this specification, including its drawings and claims.

SUMMARY OF THE INVENTION

It is an object of the present invention to provide for additives for making tires or treads, tires, treads, and methods of making and using the foregoing.

It is another object of the present invention to provide for additives for making tires or treads comprising resin made from terpenes, aromatics and phenols, and to tires, treads, and methods of making and using the foregoing.

These and other objects of the present invention will become apparent to those of skill in the art upon review of this specification, including its drawings and claims.

According to a non-limiting embodiment of the present invention, there is provided a tire tread composition. The composition may include a rubber component selected from the group consisting of synthetic diene rubber and natural rubber. The composition may also include an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds.

According to another non-limiting embodiment of the present invention, there is provided a tire tread additive comprising an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds.

According to even another non-limiting embodiment of the present invention, there is provided a method of making a tire tread composition. The method may include contacting a rubber component selected from the group consisting of synthetic diene rubber and natural rubber, with an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds.

According to non-limiting subembodiments of the above embodiments, component a) may be an olefinically unsaturated non-acidic terpene compound, wherein component b) may be selected from the group consisting of styrene and alkyl substituted styrene, and/or component c) may be selected from the group consisting of phenol and alkylated phenol.

According to non-limiting subembodiments of the above embodiments, component a) may be a terpene selected from the group consisting of α-Pinene, β-Pinene, δ-3-Carene, 3-Carene, D-limonene, and dipentene, wherein component b) may be selected from the group consisting of styrene and alkyl substituted styrene, and/or component c) may be selected from the group consisting of phenol and alkylated phenol.

According to non-limiting subembodiments of the above embodiments, component a) may be selected from the group consisting of mono- and bi-cyclic mono- and bi-unsaturated hydrocarbons, and/or component b) may be selected from the group consisting of styrene and alkyl substituted styrene, and wherein component c) is selected from the group consisting of phenol and alkylated phenol.

These and other non-limiting embodiments and non-limiting subembodiments will become apparent upon review of this specification.

DETAILED DESCRIPTION OF THE INVENTION

The present invention relates to resin made from monomers of phenolic compounds, monomers of vinyl aromatic hydrocarbons, monomers of olefinically unsaturated non-acidic terpene compounds, and/or monomers of unsaturated aliphatic, cycloaliphatic and bicyloaliphatic hydrocarbons. Such resin and methods of making are described in U.S. Pat. No. 4,701,517, and U.S. Pat. No. 5,723,566 which are incorporated herein by reference.

For certain non-limiting embodiments, it has been found that resins made by polymerization using monomers of the group of unsaturated aliphatic, cycloaliphatic and bicyloaliphatic hydrocarbons and/or monomers of the group of olefinically unsaturated non-acidic terpene compounds, and monomers of the group of vinyl aromatic hydrocarbons and monomers of the group of phenolic compounds, improve the balance between rolling resistance, wet skid resistance and abrasion resistance while maintaining surprisingly a high steering stability, when added to tire tread compounds The present invention may utilize any weight percent of the phenol, vinyl aromatic monomer and terpene and/or unsaturated aliphatic, cycloaliphatic and bicyloaliphatic hydrocarbon in the making of resin, including anywhere from 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, weight percent of any of the components, provided that the components together add to 100 weight percent, based on the weight of the phenol, vinyl aromatic monomer, terpene and/or unsaturated aliphatic, cycloaliphatic and bicyloaliphatic hydrocarbon. The particular weight percent of each component will depend upon the desired end use of the resin.

Certainly, any suitable substitutes for the phenol, vinyl aromatic monomer, terpene and unsaturated aliphatic, cycloaliphatic and bicyloaliphatic hydrocarbon may be utilized. As non-limiting examples, alternative monomers include styrene and its derivatives, any terpene monomer non-limiting examples of which include 3 carene, α-pinene, β-pinene, D-limonene and dipentene, and phenol may be substituted by alkylated phenol.

EXAMPLES

A) Resins

A.1) Resin Compositions

In order to study the influence of the 3 different monomers on the viscoelastic properties of a silica tread compound, an experimental design was established for the synthesis of resins based on following selected monomers:

Terpene component: α-Pinene, δ-3-Carene, β-Pinene, D-limonene

Aromatic vinyl component: Styrene and α-Methyl Styrene (AMS)

Phenol component: Phenol only.

Further refinement resulted in a 4 factor design with the following factors:

| | | Level −1 | Level +1 |
|---|---|---|---|
| Factor 1: | Terpene type | δ-3-Carene | α-Pinene |
| Factor 2: | Aromatic Vinyl type | Styrene | AMS |
| Factor 3: | Ratio Aromatic/Terpene | low | high |
| Factor 4: | Ratio Olefinic monomer/Phenol | 16% | 22% |

Because these new resins are based on 3 different classes of monomers, they are called Ternary reins. The experimental array is extended by adding resins compositions based on other terpene monomers, e.g. Resin N is like Resin B in which α-Pinene is replaced by D-Limonene. Resin K is like Resin C in which α-Pinene is replaced by β-Pinene, etc. The resin compostions and their corresponding properties are shown in table 1.

TABLE 1

Resin compositions and corresponding properties

| | Resin Composition | | | | | | |
|---|---|---|---|---|---|---|---|
| | A | B | C | D | E | F | G |
| Terpene | | | | | | | |
| α-Pinene | 42 | | 67.2 | | 42 | 67.2 | 62.4 |
| Δ3-Carene | | 39 | | 62.4 | | | |
| D-Limonene | | | | | | | |
| β-Pinene | | | | | | | |
| Aromatic vinyl | | | | | | | |
| Styrene | 42 | 39 | | | | 16.8 | 15.6 |
| α-Methyl Styrene | | | 16.8 | 15.6 | 42 | | |
| Phenol | 16 | 22 | 16 | 22 | 16 | 16 | 22 |
| Resin Properties | | | | | | | |
| Softening point R&B [° C.] | 115 | 91 | 96 | 100 | 96 | 96 | 95 |
| Molecular Weight | | | | | | | |
| Weight Av. Mw [D] | 1093 | 830 | 850 | 791 | 791 | 1057 | 1033 |
| Number Av. Mn [D] | 808 | 615 | 517 | 502 | 497 | 644 | 700 |
| Polydispersity | 1.352 | 1.349 | 1.644 | 1.572 | 1.59 | 1.641 | 1.475 |

TABLE 1-continued

Resin compositions and corresponding properties

| | Resin Composition | | | | | | |
|---|---|---|---|---|---|---|---|
| | H | I | J | K | L | M | N |
| Terpene | | | | | | | |
| α-Pinene | 39 | | | | | | |
| Δ3-Carene | | | 39 | | 62.4 | | |
| D-Limonene | | | | | | 62.4 | 39 |
| β-Pinene | | 42 | | 67.2 | | | |
| Aromatic vinyl | | | | | | | |
| Styrene | | 42 | | | 15.6 | | 39 |
| α-Methyl Styrene | 39 | | 39 | 16.8 | | 15.6 | |
| Phenol | 22 | 16 | 22 | 16 | 22 | 22 | 22 |
| Resin Properties | | | | | | | |
| Softening point R&B [° C.] | 98 | 107 | 96 | 96 | 95 | 94 | 94 |
| Molecular Weight | | | | | | | |
| Weight Av. Mw [D] | 719 | 1072 | 709 | 838 | 1049 | 833 | 906 |
| Number Av. Mn [D] | 545 | 796 | 507 | 532 | 645 | 475 | 666 |
| Polydispersity | 1.319 | 1.347 | 1.34 | 1.575 | 1.626 | 1.735 | 1.361 |

A.2.) Resin Synthesis

In Table 1 a summary of the all synthesized resins highlighting the selection and their properties are provided.

The resins synthesis description for Resin C(XR7118) below serves as an example for all the reactions carried out:

I. Raw Materials

α-Pinene, Phenol, α-Methyl Styrene (AMS), Boron Trifluoride, Toluene, water, and Sodium Carbonate.

II. Procedure

II.A. Dehydration of Solvent and Phenol:

(i) Charge 191 g of toluene to a 1.0 Liter Morton flask equipped with an agitator, a Dean-Stark trap attached to a condenser, and a thermocouple probe assembly with an inlet for nitrogen.

(ii) Add 40.0 g of phenol to the toluene (iii) Fill up the DS trap with toluene.

(iv) Place an electric heating mantle under the Morton flask. Begin heating and bring contents to reflux.

(v) When refluxing begins, any water being removed from the solution will begin collecting at the bottom in the Dean-Stark trap. Allow contents to reflux for 2 hours.

II.B. Polymerization:

(i) Cool the toluene+phenol solution above to ambient temperature and carefully charge 1.2 g of boron trifluoride gas.

(ii) The gas will form a complex with phenol and the solution will acquire a red-brown color.

(iii) Once the gas has been charged, resume a gentle flow of nitrogen through the flask and gradually begin to warm contents to 37° C.

(iv) At 37° C., begin adding drop-wise 168.0 g of α-Pinene.

(v) As the reaction initiates, the temperature in the flask will rise; allow it to rise to 40° C. and then maintain the entire polymerization process at 40-42° C.

(vi) Feed the α-Pinene over a period of 90 minutes under a nitrogen atmosphere, with agitation, at 40-42° C.

(vii) After completing the α-Pinene addition, immediately commence drop-wise addition of 42.0 g of AMS.

(viii) Feed the AMS over a period of 30 minutes under a nitrogen atmosphere, with agitation, at 40-42° C.

(ix) Once the α-Pinene and AMS have been fed, maintain reaction contents at 40-42° C. for an additional 60 minutes, with agitation under a nitrogen atmosphere.

II.C. Neutralization of Catalyst:

(i) Quench the reaction by adding an aqueous solution of sodium carbonate (1.2 g) in 100 mL of water.

(ii) Heat contents to 75-80° C. and agitate for 10 minutes.

(iii) Allow layers to separate and draw off the aqueous layer.

(iv) Add 100 mL of water to the reaction flask again and wash the mixture; repeat steps (ii) and (iii) above.

II.D. Distillation and Stripping to Softening Point:

Transfer the resin solution to a tared 4-neck round bottom flask. Equip the flask with an agitator, a condenser via a 3-way take-off adapter, a thermocouple assembly, and a sparge tube for nitrogen sparging. Insert the sparge tube below the surface of the solution and begin nitrogen sparge (~2000 cc/min). Begin agitation and start heating using an electric heating mantle. Distill off the solvent and terpene by-products between 140 and 170° C., and continue heating to 245° C. When the contents reach 245° C., terminate the sparge and maintain a nitrogen purge. Lower heating mantle and draw out a sample (~2 mL) of the hot resin for softening point. Obtain a softening point (base s.p.) using a Mettler or Herzog instrument and resume heating and nitrogen sparge. Continue sparging at 245° C. to strip out residual terpene-phenol dimers (by-products of a TP resin process), and sample as needed for s.p. measurements till s.p. of 96-100° C. is reached. Once at the desired s.p., lower mantle, discontinue nitrogen sparge and pour sample out for color, softening point, and obtain a final resin yield.

A typical synthesis affords the resin C(XR7118) with a softening point of 96° C. and an overall yield of 90% (based upon initial charge of reactants).

B. Silica Tread Compounds

B.1.) Compound Formulations

The resins according to table 1 have been incorporated into typical Silica filled tread compounds. The addition level of the resin and of oil was varied. The compound formulations can be found in table 2. They were mixed a 3 stage process as described in Table 3.

TABLE 2

Compound formulations of the reference compound containing no resin, and compounds containing resin without (Formula I) and with oil compensation (Formula II and III)

| Raw Materials (parts per hundred parts rubber) | Reference compound | Compd. Formula I | Compd. Formula II | Compd. Formula III |
|---|---|---|---|---|
| S-SBR Buna ® VSL 5025-0 HM | 70 | 70 | 70 | 70 |
| BR Buna ® CB 24 | 30 | 30 | 30 | 30 |
| Silica Ultrasil ® 7000 GR | 80 | 80 | 80 | 80 |
| Carbon Black Statex ® N 234 | 10 | 10 | 10 | 10 |
| Silan Si 69 ® | 8 | 8 | 8 | 8 |
| Mineral oil TDAE Viva Tec ® 500 | 20 | 20 | 16 | 8 |
| IPPD Vulkanox ® 4010 | 1 | 1 | 1 | 1 |
| 6PPD Vulkanox ® 4020 | 2 | 2 | 2 | 2 |
| TMQ Vulkanox ® HS | 0.5 | 0.5 | 0.5 | 0.5 |
| Ozon wax Antilux ® 654 | 1 | 1 | 1 | 1 |
| ZnO Zinkoxid Rotsiegel ® | 3 | 3 | 3 | 3 |
| Stearic acid | 1 | 1 | 1 | 1 |
| Resin | 0 | 4 | 4 | 12 |
| Sulfur | 1.5 | 1.5 | 1.5 | 1.5 |
| CBS Vulkacit ® CZ | 1.5 | 1.5 | 1.5 | 1.5 |
| DPG Vulkacit ® D | 2 | 2 | 2 | 2 |

TABLE 3

Mixing protocol for Silica filled tire tread compound.

| Mixing stage | Time (sec) | Components |
|---|---|---|
| 1 | 0-60 | Polymers |
|  | 61-150 | 50 phr Silica, 5 phr Si69, Carbon Black, Stearic acid, ZnO |
|  | 150-360 | 30 phr Silica, 3 phr Si69, TDAE, Antioxidants, Wax |
|  | Ram lift at 300 sec |  |
| 2 | 0-270 | Batch from stage 1 |
| after 24 h | Ram lift at 180 sec |  |
| 3 | 0-30 | batch from stage 2 |
| after 24 h | 30-90 | Sulfur, Accelerators |

The compounds were formed into 2 mm test plates and cured at 160° C. according to their respective t90 values plus 1 minute per mm of test plate thickness, whereas t90 is determined by vulcametry according to DIN53529, and d is the thickness of the rubber slab in mm.

B.2.) Compound Testing
Test Methods:
Mooney refers to
Mooney viscosity MS (1+4) at 100° C. according to DIN 53523
Min Torque, Max Torque, T90 refers to
Curing behavior (rheometer measurements) according to DIN 53529 at 160° C.
Hardness refers to
Hardness Shore A according to DIN 53505
Tensile, elongation, M100, M200, M300 refers to Tensile properties (tensile strength at elongation at break, modulus M100 at 100%, M200 at 200% and M300 at 300% elongation) according to DIN 53504.

The dynamic mechanical analysis (DMA) was carried out by means of a Rheometrics Dynamic Analyzer (RDA 11). Modulus and tan δ were measured as function of the temperature between −100 and +150° C. at a frequency of 1 Hz and an amplitude of 0.5%.

C. Testing

The resins A to L according to the invention are benchmarked against a reference compound containing no resin and against commercially available resins Sylvares® SA85 and Sylvares® TR5147 and resin Sylvares® TP115 (all resins available from Arizona Chemical, Sylvares® is a reg. trademark of Arizona Chemical). Due the vicinity of the chemistry, a mixture of Sylvares® SA85 and Sylvares® TP115 representing another possibility to tailor the viscoelastic properties of a tread, is added to the test program. Compounds are made according to different formulations (table 2) in which the resin dosage level is varied between 4 and 12 phr. In compound formulation I, 4 phr resin are added on top of the reference formulation, while in formulation II and III the addition of resin was compensated by a reduction of the oil dosage.

D Results

Data from the all the compounds are presented in table 4, 5 and 6, related to the compound formulation used.

TABLE 4

Mooney viscosity, Vulcametry, mechanical and dynamic properties of compounds according to formulation I

|  |  | Resin | | | | | | |
|---|---|---|---|---|---|---|---|---|
|  |  | Sylvares® TR5147 | Sylvares® TP115 | Sylvares® SA85 | Resin A (XR7116) | Resin B (XR7117) | Resin C (XR7118) | Resin D (XR7119) |
| Compound Fomula | | I | I | I | I | I | I | I |
| Compound properties | | | | | | | | |
| Mooney Viscosity | MS 1 + 4 100° C. | 37 | 36 | 33 | 39 | 38 | 36 | 33 |

TABLE 4-continued

Mooney viscosity, Vulcametry, mechanical and dynamic properties of compounds according to formulation I

| | | Resin | | | | | | |
|---|---|---|---|---|---|---|---|---|
| | | Sylvares ® TR5147 | Sylvares ® TP115 | Sylvares ® SA85 | Resin A (XR7116) | Resin B (XR7117) | Resin C (XR7118) | Resin D (XR7119) |
| Vulcameter 160° C. | | | | | | | | |
| Min. Torque | dNm | 2.31 | 2.26 | 2.25 | 2.68 | 2.66 | 2.64 | 2.18 |
| Max Torque | dNm | 23.05 | 22.59 | 23.06 | 21.81 | 23.35 | 22.53 | 22.54 |
| Delta Torque | dNm | 20.74 | 20.33 | 20.81 | 19.13 | 20.69 | 19.89 | 20.36 |
| T90 | min | 16.63 | 17.13 | 18 | 17.39 | 16.67 | 16.65 | 17.27 |
| Mechanical Properties | | | | | | | | |
| Hardness | Shore A | 70 | 68 | 69 | 68 | 71 | 70 | 69 |
| Tensile Strength @ break | Mpa | 19.5 | 20.4 | 20.3 | 19.7 | 20.3 | 18.8 | 21.1 |
| Tensile Elongation @ break | % | 364 | 387 | 394 | 375 | 365 | 376 | 414 |
| Tensile Strength @ 100% Elongation | Mpa | 3.2 | 3.1 | 3.1 | 3.2 | 3.5 | 3.3 | 3.0 |
| Tensile Strength @ 200% Elongation | Mpa | 8.5 | 8.3 | 8.1 | 8.2 | 9 | 8.2 | 7.9 |
| Tensile Strength @ 300% Elongation | Mpa | 15 | 17.7 | 14.4 | 14.7 | 15.8 | 14.4 | 14.1 |
| Dynamic Properties | | | | | | | | |
| Tan Delta @ 0° C. | | 0.2317 | 0.2244 | 0.2282 | 0.2445 | 0.2229 | 0.2331 | 0.2352 |
| @ 10° C. | | 0.2043 | 0.1993 | 0.207 | 0.2145 | 0.1968 | 0.2103 | 0.2151 |
| @ 50° C. | | 0.1336 | 0.1343 | 0.1415 | 0.1412 | 0.1229 | 0.1389 | 0.1427 |
| @ 60° C. | | 0.1217 | 0.1235 | 0.1298 | 0.1304 | 0.1102 | 0.1209 | 0.1246 |

Concerning the Mooney viscosity, all compounds containing the Ternary resins (A to D) are not very much different to the benchmark compounds suggesting that there are no difference differences or problems in processing these materials. Also, the vulcametry data in table 4 on the curing behavior do not highlight any significant differences to the benchmark compounds. Interesting to note is however the low viscosity of Compound D containing XR7119. This resin shows similar behavior as the compound containing SA85 which is known that it causes lower compound viscosities. Low compound viscosities help in extrusion of the compound into sheets and strips required to build a tire.

In summary, the new experimental resins do not affect the viscosity and curing behavior of uncured compounds and would fit into common manufacturing process.

Static Physical Properties of Vulcanised Compounds

As with the properties of the uncured compounds, there is little difference of the static physical properties such as hardness, tensile strength and elongation to the benchmark compounds. Remarkable however is the significantly higher 100% tensile modulus of the compound containing the resin B (XR7117), also recognizable by the highest hardness of 71. The performance of all experimental resins fall within the requirements of silica tread compound.

Dynamic Properties of Vulcanized Compounds

As described earlier it is generally accepted that the damping factor tan δ measured in a Dynamic Mechanical Analysis (DMA) in a temperature sweep mode provide indication on the wet grip and rolling resistance. Therefore damping factors at various temperatures are shown in table 4.

The damping factors at lower temperatures of 0° C. and 10° C. should be high which indicates improved increase wet grip, while those at temperatures of 50° C. and 60° C. should be low as possible to indicate low rolling resistance. Compounds containing Resin A (XR7116), C(XR7118) and D(XR7119), and show high damping values at lower temperatures and should therefore generate treads with very good grip performance. At higher temperatures Resin B(XR7117) shows the lowest damping factor indicating lowest rolling resistance. However, Resin C(XR7118) has the best balance of both criteria which is would be a representation for an extension of the famous trade-off of tire treads between grip and rolling resistance.

In Table 5 the compounds according to Formulation II are shown. Again, the properties in the uncured state and the static properties in the cured do not differ significantly. Comparing the dynamic properties of the reference compound with those compounds containing the commercial resin reveal that the latter have higher low temperature tan delta and lower high temperature tan delta than the reference but then on the expense of low dynamical storage modules (or dynamic stiffness) at higher temperatures indicating a drop in handling performance. The compounds containing the resins according to the invention increase the low temperature tan delta and reduce the high temperature tan delta, e.g. Resin K, but also maintain the dyn. Storage modulus, e.g. Resin K.

TABLE 5

Mooney viscosity, Vulcametry, mechanical and dynamic properties of compounds according to formulation II

| | | | | | | Resin | | | | |
|---|---|---|---|---|---|---|---|---|---|---|
| | | | Sylvares ® TR5147 | Sylvares ® TP115 | Sylvares ® SA85 | Sylvares ® Blend* | Resin J | Resin D (XR7119) | Resin K | Resin F |
| Compound Fomula | | Ref. | II | II | II | II | II | II | II | II |
| Compound Properties | | | | | | | | | | |
| Mooney Viscosity | ML 1 + 4 100° C. | 69 | 78 | 74 | 76 | 71 | 81 | 75 | 81 | 76 |

TABLE 5-continued

Mooney viscosity, Vulcametry, mechanical and dynamic properties of compounds according to formulation II

|  |  | Resin |  |  |  |  |  |  |  |
|---|---|---|---|---|---|---|---|---|---|
|  |  | Sylvares ® TR5147 | Sylvares ® TP115 | Sylvares ® SA85 | Sylvares ® Blend* | Resin J | Resin D (XR7119) | Resin K | Resin F |
| Vulcameter 160° C. |  |  |  |  |  |  |  |  |  |
| Min. Torque | dNm | 2.50 | 2.85 | 2.76 | 2.84 | 2.68 | 2.90 | 2.72 | 2.92 | 2.82 |
| Max Torque | dNm | 24.81 | 23.38 | 24.23 | 23.39 | 23.50 | 23.85 | 23.82 | 23.8 | 23.9 |
| Delta Torque | dNm | 22.31 | 20.53 | 21.47 | 20.55 | 20.82 | 20.95 | 21,.0 | 20.88 | 21.08 |
| T90 | min | 14.65 | 13.92 | 14.26 | 13.70 | 13.97 | 14.25 | 14.22 | 15.01 | 13.36 |
| Mechanical Properties |  |  |  |  |  |  |  |  |  |
| Hardness | Shore A | 70 | 70 | 71 | 70 | 69 | 71 | 70 | 70 | 70 |
| Tensile Strength @ break | Mpa | 20.8 | 20.8 | 19.9 | 21 | 20.2 | 20.7 | 20.2 | 20.5 | 20.4 |
| Tensile Elongation @ break | % | 365 | 322 | 322 | 331 | 334 | 305 | 334 | 301 | 307 |
| Tensile Strength @ 100% Elongation | Mpa | 3.2 | 3.8 | 3.7 | 3.6 | 3.4 | 4.0 | 3.4 | 4.2 | 4.0 |
| Tensile Strength @ 200% Elongation | Mpa | 9 | 10.8 | 10.2 | 10.3 | 9.6 | 11.5 | 9.5 | 11.8 | 11.3 |
| Tensile Strength @ 300% Elongation | Mpa | 16.2 | 19.0 | 18.2 | 18.6 | 17.3 | 20.2 | 17.4 | 20.6 | 19.8 |
| Tear Resistance | N/mm | 16.5 | 13.9 | 19.1 | 19.4 | 16.5 | 15.3 | 18.7 | 7.6 | 19.2 |
| Density | g/cm3 | 1.216 | 1.207 | 1.218 | 1.211 | 1.215 | 1.216 | 1.211 | 1.213 | 1.212 |
| DIN-Abrasion | mm3 | 86 | 87 | 88 | 87 | 90 | 91 | 90 | 88 | 91 |
| Dynamic Properties |  |  |  |  |  |  |  |  |  |
| Tan Delta @ 0° C. |  | 0.23747 | 0.25222 | 0.24743 | 0.23664 | 0.23889 | 0.24976 | 0.25002 | 0.25677 | 0.25054 |
| @ 10° C. |  | 0.20609 | 0.20374 | 0.20322 | 0.19277 | 0.19802 | 0.20501 | 0.20881 | 0.20546 | 0.20616 |
| @ 50° C. |  | 0.13242 | 0.11742 | 0.12158 | 0.11593 | 0.11711 | 0.12417 | 0.13048 | 0.12082 | 0.12287 |
| @ 60° C. |  | 0.12646 | 0.11377 | 0.11321 | 0.11253 | 0.115 | 0.11575 | 0.11986 | 0.10827 | 0.11575 |
| Dyn. Storage Modulus E' @ 50° C. | Pa | 7.90E+06 | 6.95E+06 | 5.68E+06 | 7.07E+06 | 6.77E+06 | 8.91E+06 | 5.95E+06 | 6.16E+06 | 6.97E+06 |
| @ 60° C. | Pa | 7.38E+06 | 6.52E+06 | 5.31E+06 | 6.62E+06 | 6.31E+06 | 8.36E+06 | 5.55E+06 | 5.74E+06 | 6.50E+06 |

Increasing the resin content in compounds has overall the advantage to increase the low temperature tan delta and reducing the high temperature tan delta as sow in table 6. Again, the compounds containing the resins according to the invention follow this trend but show extreme values in combination with elevated dynamic Storage Moduli E', as highlighted by the compounds containing Resin A, Resin E, Resin I and Resin L.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A tire tread composition comprising silica, carbon black, sulfur, a rubber component selected from the group consisting of synthetic diene rubber and natural rubber, and an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds wherein the tire tread composition has improved handling performance as evidenced by an increased dynamic storage modulus (E') at 50° C. or 60° C. compared with that of a similar composition prepared in the absence of the resin.

2. The tire tread composition of claim 1, wherein component a) is an olefinically unsaturated non-acidic terpene compound, wherein component b) is selected from the group consisting of styrene and alkyl substituted styrene, and wherein component c) is selected from the group consisting of phenol and alkylated phenol.

3. The tire tread composition of claim 1, wherein component a) is a terpene selected from the group consisting of α-pinene, β-pinene, δ-3-carene, 3-carene, D-limonene, and dipentene, wherein component b) is selected from the group consisting of styrene and alkyl substituted styrene, and wherein component c) is selected from the group consisting of phenol and alkylated phenol.

4. The tire tread composition of claim 1, wherein component a) comprises at least one monomer selected from the group consisting of mono- and bi-cyclic mono- and bi-unsaturated hydrocarbons, wherein component b) is selected from the group consisting of styrene and alkyl substituted styrene, and wherein component c) is selected from the group consisting of phenol and alkylated phenol.

5. A method of making a tire tread composition comprising contacting a composition comprising silica, carbon black, sulfur, and a rubber component selected from the group consisting of synthetic diene rubber and natural rubber, with an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds wherein the tire tread composition has improved handling performance as evidenced by an increased dynamic storage modulus (E') at 50° C. or 60° C. compared with that of a similar composition prepared in the absence of the resin.

6. The method of claim 5, wherein component a) is an olefinically unsaturated non-acidic terpene compound, wherein component b) is selected from the group consisting of styrene and alkyl substituted styrene, and wherein component c) is selected from the group consisting of phenol and alkylated phenol.

7. The method of claim 2, wherein component a) is a terpene selected from the group consisting of α-pinene, β-pinene, δ-3-Carene, 3-Carene, D-limonene, and dipentene, wherein component b) is selected from the group consisting of styrene and alkyl substituted styrene, and wherein component c) is selected from the group consisting of phenol and alkylated phenol.

8. The method of claim 5, wherein component a) comprises at least one monomer selected from the group consisting of mono- and bi-cyclic mono- and bi-unsaturated hydrocarbons, wherein component b) is selected from the group consisting of styrene and alkyl substituted styrene, and wherein component c) is selected from the group consisting of phenol and alkylated phenol.

9. The tire tread composition of claim 1 wherein the resin is used in an amount within the range of 4 to 12 parts by weight per 100 parts by weight of rubber component.

10. The tire tread composition of claim 1 having improved wet grip as evidenced by an increased tan delta at 0° C. or 10° C. compared with that of a similar composition prepared in the absence of the resin.

11. The tire tread composition of claim 1 having improved rolling resistance as evidenced by a decreased tan delta at 50° C. or 60° C. compared with that of a similar composition prepared in the absence of the resin.

12. A method which comprises formulating a silica-filled tire tread using, as an additive for the tire tread, a composition comprising an oligomeric resin derived from component a) comprising at least one monomer selected from the group consisting of terpenes and mono- and bi-cyclic mono- and bi-unsaturated hydrocarbons, component b) comprising at least one monomer selected from the group consisting of vinyl aromatic compounds and component c) comprising at least one monomer selected from the group consisting of phenolic compounds wherein the tire tread composition comprises silica, carbon black, sulfur, and a rubber component selected from the group consisting of synthetic diene rubber and natural rubber; and wherein the tire tread composition has improved handling performance as evidenced by an increased dynamic storage modulus (E') at 50° C. or 60° C. compared with that of a similar composition prepared in the absence of the resin.

13. The method of claim 12, wherein component a) is an olefinically unsaturated non-acidic terpene compound, wherein component b) is selected from the group consisting of styrene and alkyl substituted styrene, and wherein component c) is selected from the group consisting of phenol and alkylated phenol.

14. The method of claim 12, wherein component a) is a terpene selected from the group consisting of α-pinene, β-pinene, δ-3-carene, 3-carene, D-limonene, and dipentene, wherein component b) is selected from the group consisting of styrene and alkyl substituted styrene, and wherein component c) is selected from the group consisting of phenol and alkylated phenol.

15. The method of claim 12, wherein component a) comprises at least one monomer selected from the group consisting of mono- and bi-cyclic mono- and bi-unsaturated hydrocarbons, wherein component b) is selected from the group consisting of styrene and alkyl substituted styrene, and wherein component c) is selected from the group consisting of phenol and alkylated phenol.

* * * * *